Sept. 8, 1970  J. O. G. DARROW  3,527,986
FAIL-SAFE ELECTRONIC CIRCUIT ARRANGEMENT
Filed Aug. 11, 1967  2 Sheets-Sheet 1

# United States Patent Office 3,527,986
Patented Sept. 8, 1970

3,527,986
FAIL-SAFE ELECTRONIC CIRCUIT ARRANGEMENT
John O. G. Darrow, Murrysville, Pa., assignor to Westinghouse Air Brake Company, Swissvale, Pa., a corporation of Pennsylvania
Filed Aug. 11, 1967, Ser. No. 660,118
Int. Cl. H02h 3/22
U.S. Cl. 317—31                                              21 Claims

ABSTRACT OF THE DISCLOSURE

A fail-safe voltage level detecting circuit, including a fixed frequency generator for producing voltage signals proportional to the amplitude of an A.C. input and including an amplitude level detector for measuring the amplitude of the voltage signals and for providing a D.C. output having a particular polarity when the amplitude of the A.C. input and in turn the amplitude of the voltage signals exceed a predetermined level.

---

Figure 1:
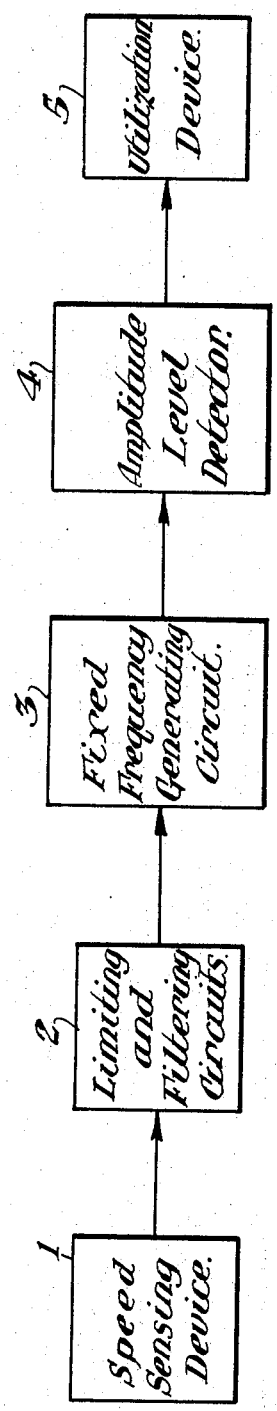

My invention relates generally to a fail-safe electronic circuit arrangement which will not result in a false indication due to the presence of any malfunction. More particularly, my invention relates to an amplitude level detecting circuit which will provide an output signal when and only when the amplitude of an input exceeds a predetermined level.

In various control systems, such as for mass and/or rapid transit operations, it is of the utmost importance to exercise extreme care in designing and constructing certain portions or circuits of the system in order to preclude injury to persons and prevent damage to the equipment. That is, in order to insure the highest degree of safety to individuals as well as apparatus, it is necessary and essential that under no circumstances will a failure cause or be capable of causing a true or valid indication. Accordingly, it is readily evident that the apparatus must operate in a fail-safe manner so that any conceivable failure will result in a condition at least as restrictive and, preferably, more restrictive than that preceding the failure. For example, a circuit malfunction or component failure in a speed control system should not be permitted to erroneously simulate and indicate a condition for holding and maintaining the vehicle speed, and, normally, it is preferred that a failure should either provide a warning, such as, flashing a light or sounding a buzzer or bell or cause braking action to stop the vehicle.

Thus, in automatic speed control systems of this type, it is initially required to accurately determine the velocity of a moving vehicle in order to verify whether the vehicle is moving at a prescirbed speed for a given area. In one particular arrangement, the speed of a moving vehicle is magnetically sensed by a suitable pickup device, such as an axle-driven frequency generator, which produces signals having a frequency directly proportional to the speed of the moving vehicle. Accordingly, in such an arrangement, it is simply necessary to establish the upper frequency limit of the generated signals in accordance with the desired prescribed speed and since the voltage of these signals may be made inversely proportional to speed; it is merely necessary to measure the amplitude of the voltage signals by a suitable amplitude level detecting circuit which will respond and produce an output only when the vehicle is moving at or under the prescribed speed. This output may in turn be employed for energizing and operating a suitable utilization device, such as an electromagnetic relay. However, it will be appreciated that the detecting circuit must operate in a fail-safe manner so that under no circumstances can an output signal be produced during a malfunction or a failure, since such an adverse condition could result in an eminently hazardous and dangerous situation. While numerous types of signal level or amplitude detecting circuits have been previously proposed, none of these prior proposals possess the necessary integrity and security demanded of speed control systems employed in mass or rapid transit operations.

Accordingly, it is an object of my invention to provide a new and improved fail-safe detector circuit.

Another object of my invention is to provide a fail-safe circuit ararngement which will not result in a false indication during a circuit or component failure.

A further object of my invention is to provide a fail-safe amplitude level detecting circuit which will provide an output when and only when the amplitude of input signals exceeds a predetermined level.

Still a further object of my invention is to provide a fail-safe circuit arrangement which will measure the amplitude of input signals and produce an output only when the amplitude of the input signal exceeds a predetermined value.

Yet another object of my invention is to provide an electronic amplitude level detector which operates in a fail-safe manner to detect signals having a predetermined characteristic prior to producing an output.

Still yet another object of my invention is to provide a fail-safe circuit arrangement for measuring the amplitude of signals having a fixed frequency and only producing an output when the amplitude of the fixed frequency signals exceeds a preselected value.

Still yet a further object of my invention is to provide an improved amplitude level detector which will provide an output only when the amplitude of selected input signals exceeds a predetermined value.

Yet still another object of my invention is to provide a fail-safe circuit ararngement which is simple to construct, feasible to use, efficient and reliable to operate.

Briefly, the present invention includes a novel circuit arrangement having a source of input signals, means for converting the input signals into electrical signals having a fixed frequency, and means for measuring the amplitude of the fixed frequency signals and for producing an output signal when and only when the amplitude of the fixed frequency signals exceeds a predetermined value. More specifically, I provide a unique circuit including a first amplifier for amplifying the input signals, a first voltage rectifier for receiving and rectifying the amplified input signals, a free-running multivibrator being supplied by the first voltage multiplier for generating fixed frequency signals, a second amplifier for amplifying the fixed freqeuncy signals, a coupling network for applying the amplified fixed frequency signals to a voltage level sensing device having a predetermined threshold value, a third amplifier for producing output signals when the amplitude of the amplified fixed frequency signals exceeds the threshold value of the voltage level sensing device, and a second voltage rectifier for receiving and rectifying the output signals.

The foregoing objects and other attendant features and advantages will be more readily appreciated as the subject invention becomes better understood by reference to the following detailed description when considered in conjunction with the accompanying drawings wherein:

FIG. 1 is a schematic block diagram of an exemplary vehicle-carried speed command system embodying the present invention.

Figure 2A:
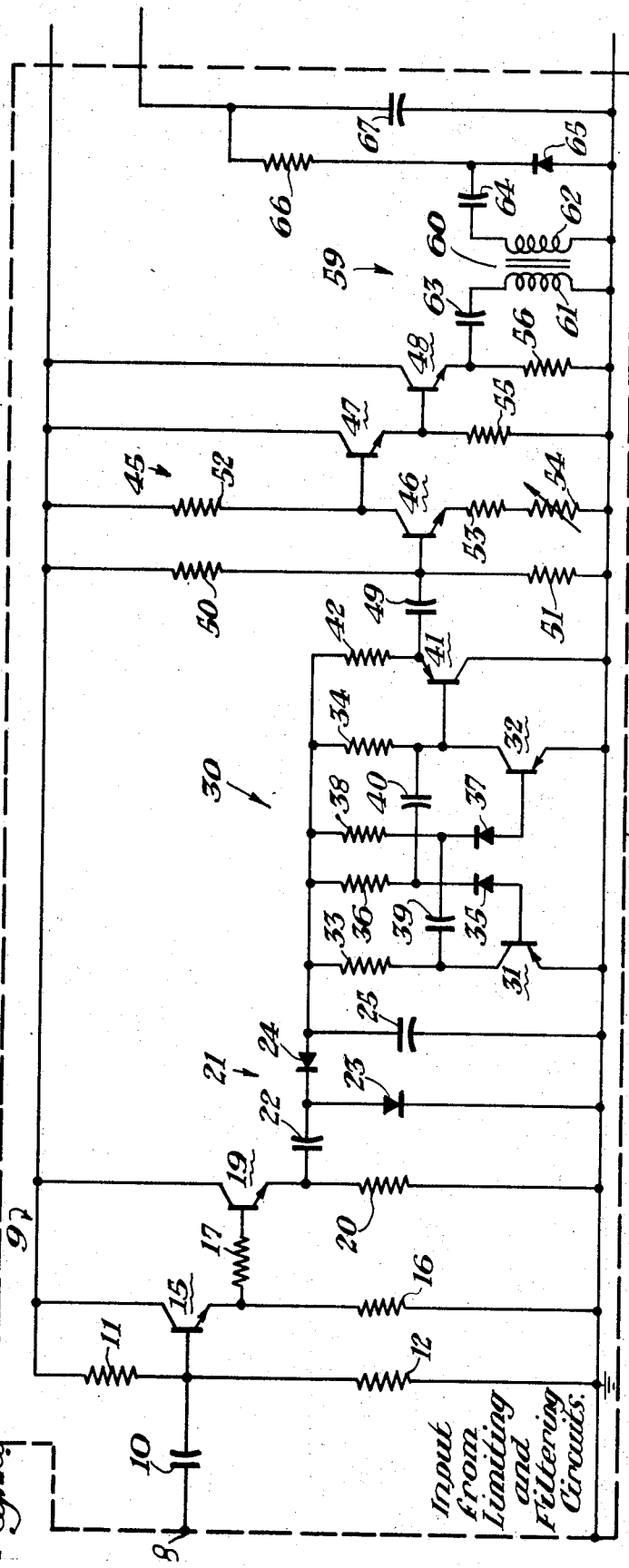
Figure 2B:
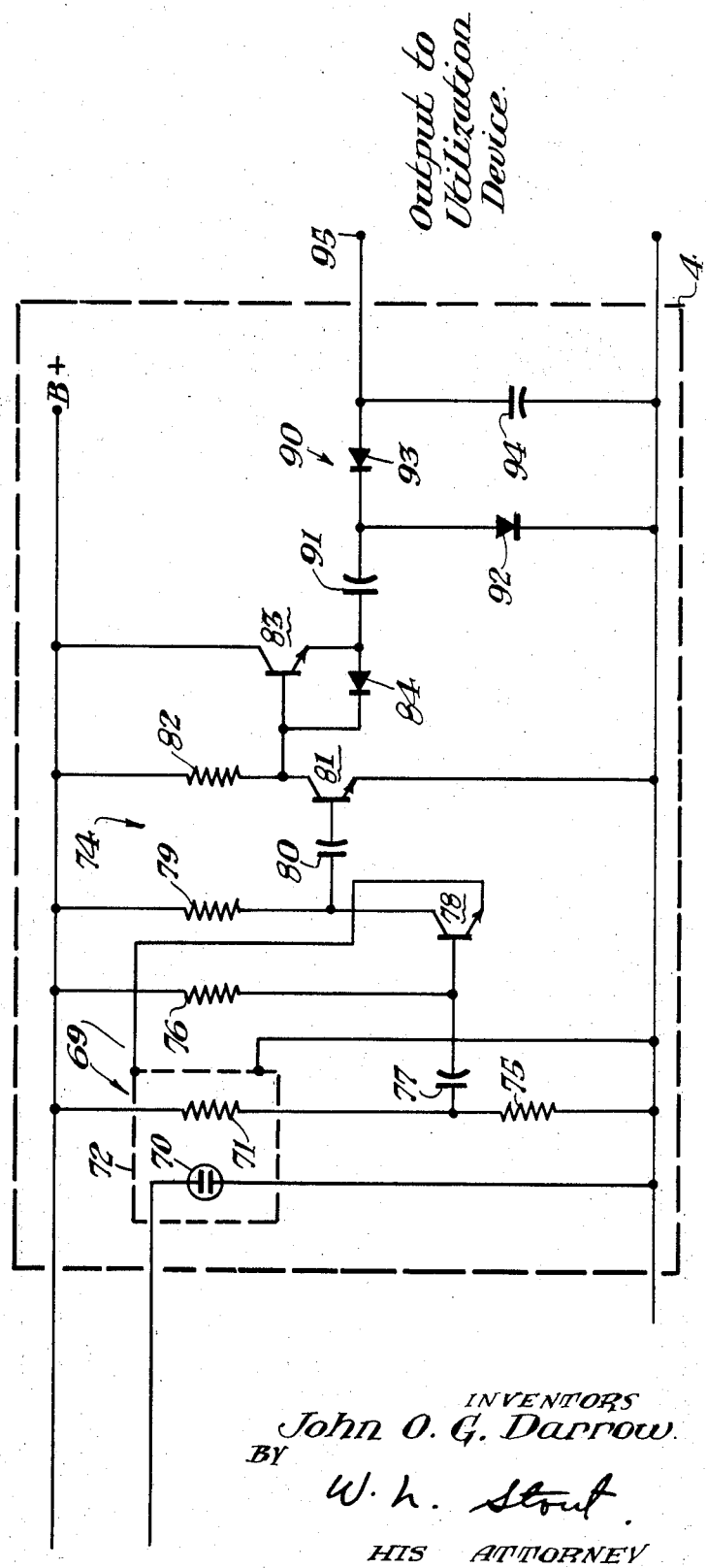

FIGS. 2A and 2B when arranged end to end with FIG. 2A on the left is a schematic diagram illustrating the details of the circuit arrangement embodying the present invention.

Referring now to the drawings and more particularly to FIG. 1, there is shown a practical vehicle-carried speed control system which may make use of the present invention. The actual speed of a moving vehicle may be obtained from a suitable speed sensing device 1, such as an axle driven frequency generator, which delivers a source of signals whose frequency is directly proportional to the speed or velocity of the moving vehicle. Since the frequency of the output signals produced by a rotating electromagnetic device is directly proportional to the revolutions per minute, a frequency generator is ideally suited as a speed sensing means. However, it is readily understood that other speed sensing devices may be employed with equal effectiveness. The signals from the speed sensing device 1 are fed to a limiting and filtering circuit 2 which operates in a fail-safe fashion. The signals are first limited by the limiter for preventing excess voltage swing in either direction thereby insuring that the generated signals will be substantially constant. These limited signals in turn are applied to a suitable low-pass filter employing four-terminal capacitors which will not fail in an unsafe manner. The filter is adapted and arranged to readily pass all frequencies below a preselected frequency. However, since by its very nature a low-pass filter rejects or greatly attenuates signals that exceed the preselected frequency, the output delivered by the limiting and filtering circuits 2 is greatly decreased when the generated signals exceed the preselected frequency. It is understood that the component values and circuit parameters of the low-pass filter may be varied and selected to any desired frequency in accordance with the prescribed speed command request for a given area. Accordingly, if it is desired to insure that a vehicle is proceeding at a speed below some preselected value, it is merely necessary to measure the amplitude of output signals taken from the low-pass filter. However, as previously mentioned, this measuring function must be performed by a fail-safe apparatus which will provide an output signal when and only when the amplitude or magnitude of the low-pass filter output exceeds a predetermined value. This operation is readily and effectively accomplished by applying the signals from the limiter-filter to the input of a fixed frequency generating circuit 3. As will be described in greater detail hereinafter, this circuit produces signals having a predetermined fixed frequency whose amplitude is proportional to the signals applied thereto. The signals from the fixed frequency generating circuit 3 are applied to the input of an amplitude level detector 4, the operation of which will be described in greater detail hereinafter. As previously mentioned, it is of the utmost importance that no valid signal be delivered by the amplitude signal level detector 4 due to the occurrence of a circuit or component failure. The output of the level detector 4 is connected to a suitable utilization device, such as an under speed electromagnetic relay 5, which is normally energized when the proper polarity of voltage is applied thereto. The electromagnetic relay may be employed either to control a warning device, such as a suitable light or buzzer, or to operate a brake actuating circuit, when the relay becomes deenergized. It will be appreciated that only signals representing a vehicle moving at or under the preselected speed should be capable of energizing the electromagnetic relay thereby signifying that the apparatus is operating properly and that the vehicle is not moving at an excessive speed.

Referring now to FIGS. 2A and 2B, there is shown the circuit details of the fixed frequency generating circuit 3 and the amplitude level detector 4 which insures that the system operate in a fail-safe manner.

As shown in FIG. 2A, the fixed frequency generating circuit 3 comprises an initial two stage amplifier 9, a voltage rectifier 21 in the form of a half-wave voltage doubler, a relaxation oscillator 30 in the form of an astable or a free-running multivibrator, a three stage amplifier 45 and a coupling network 59.

As shown in FIG. 2B, the amplitude level detector 4 comprises a voltage level sensing device 69, a three stage A.C. amplifier 74 and a voltage rectifier 90 in a form of a half-wave voltage doubler.

More specifically, the signals from the limiter-filter are applied to input terminal 8 of the fixed frequency generating circuit 3 and, in particular, are delivered to the base electrode of the first stage of amplifier 9, namely, NPN transistor 15, by coupling capacitor 10. The potential of the base electrode of transistor 15 is maintained at the proper D.C. voltage level by the voltage dividing network which consists of resistors 11 and 12 connected in series between the positive potential B+ of a suitable supply source forming the main power supply which is not illustrated, and a point of reference or ground potential. The collector electrode of transistor 15 is directly connected to the positive supply terminal B+. The emitter electrode of transistor 15 is connected through resistor 16 to ground. The emitter electrode of transistor 15 is also connected through a low value resistor 17, approximately 100 ohms, to the base electrode of the second stage NPN transistor 19. This latter resistor 17 operates as a parasitic suppressor for preventing undesired self-sustaining oscillations due to regenerative feedback. The collector electrode of transistor 19 is directly connected to the positive supply terminal B+. The emitter electrode of transistor 19 is connected to ground by resistor 20. It may be noted that the circuit parameters of the amplifier 9 are chosen to provide voltage gain which will not increase due to component failure. In the present case, the amplifier 9 is in the form of an emitter-follower arrangement having unity voltage gain.

The amplified signals are taken from the emitter electrode of transistor 19 and are applied to the fail-safe voltage rectifier or half-wave voltage doubler 21. The voltage doubler 21 includes a series charging capacitor 22 having one end connected to the emitter of transistor 19 and having the other end connected to the junction of series connected diode rectifiers 23 and 24. The cathode of diode rectifier 23 is connected to ground while its anode is connected to the cathode of diode 24. The anode of diode 24 is connected to one end of doubler charging capacitor 25 while the other end of the capacitor 25 is connected to ground. It will be noted that the voltage doubler 21 rectifies the A.C. signals obtained from amplifier 9 and provides a suitable negative supply or operating potential for the relaxation oscillator 30. It will be noted that the operating potential for this oscillator is chosen to be of opposite polarity to that of the main power supply so that oscillations cannot occur due to any failure which connects the oscillator to the main supply.

The relaxation oscillator 30 comprises an astable or free-running multivibrator including transistors 31, 32 and 41 each preferably of the PNP type. The emitter electrodes of transistors 31 and 32 are directly connected to ground. The collector electrodes of transistors 31 and 32 are connected to the output of voltage doubler 21 by resistors 33 and 34, respectively. The base electrode of transistor 31 is connected by diode 35 and by resistor 36 to the output of the voltage doubler 21. Similarly, the base electrode of transistor 32 is connected by diode 37 and resistor 38 to the output of the voltage doubler 21. The timing capacitors 39 and 40 are coupled by the respective diodes 37 and 35 from the collector electrodes of transistors 31 and 32, respectively, to the base electrode of the other transistor. The diodes 35 and 37 are utilized to prevent tunneling or "Zener" breakdown of the base electrodes in silicon transistors 31 and 32. However, diodes 35 and 37 may be omitted when germanium transistors are employed for semiconductive elements 31 and 32 since germanium transistors are capable of withstanding higher base voltages. The collector electrode of transistor 32 is directly connected to the base electrode of transistor 41. The collector electrode of transistor 41 is directly connected to ground. The emitter electrode of transistor 41 is connected to the output of voltage doubler 21 by resistor 42. It will be noted that the signals appearing on the emitter of transistor 41 will be in a form of square-wave signals having a frequency dependent upon the capacitive and resistive values of the cross-coupling networks and having an amplitude proportional to the voltage level of D.C. potential supplied by the voltage doubler 21.

The square-wave signals from oscillator 30 are applied to the input of three-stage amplifier 45 which includes NPN transistors 46, 47 and 48. These square-wave signals are coupled to the base electrode of transistor 46 by coupling capacitor 49. The potential of the base electrode of transistor 46 is maintained at a proper D.C. voltage level by voltage dividing network which consists of resistors 50 and 51 connected in series between the positive supply terminal B+ and ground. The collector electrode of transistor 46 is connected through resistor 52 to positive terminal B+. The emitter electrode of transistor 46 is connected through series connected resistor 53 and adjustable resistor 54 to ground. The adjustable resistor 54 is employed to provide a safe manner of adjusting gain. The collector electrode of transistor 46 is directly connected to the base electrode of transistor 47. The collector electrode of transistor 47 is directly connected to the positive terminal B+ while the emitter electrode of transistor 47 is connected through resistor 55 to ground. The emitter electrode of transistor 47 is directly connected to the base electrode of transistor 48. The collector electrode of transistor 48 is directly connected to the positive supply terminal B+. The emitter electrode of transistor 48 is connected through resistor 56 to ground.

The amplified square-wave signals from amplifier 45 are taken from the emitter electrode of transistor 48 and are applied to coupling network 59. The coupling network includes a suitable step-up transformer 60 having a primary winding 61 and a secondary winding 62. One end of the primary winding 61 is connected to the emitter electrode of transistor 48 by capacitor 63 while the other end of the primary winding 61 is directly connected to ground. One end of the secondary winding 62 is connected by capacitor 64 to the cathode of diode rectifier 65 while the other end of the primary winding 62 is connected to ground. The anode of diode rectifier 65 is connected to ground while its cathode is connected through a current limiting resistor 66 to one end of filtering capacitor 67. The other end of filtering capacitor 67 is connected to ground.

The stepped-up rectified signals from the coupling network are now applied to the amplitude level detector 4. The level detector 4 includes a voltage level sensing device 69 comprising a four terminal photosensitive or optoelectronic element manufactured by the Raytheon Company under the name of "Raysistor." This device consists of a light source or neon lamp 70 and a photopositive resistor 71 appropriately mounted within a suitable metallic case or housing 72. The resistance value of the photopositive element 71 varies in accordance with the amount of radiant energy impinging thereon. For example, when the lamp 70 is "off" or nonilluminated the resistive value of element 71 is relatively high whereas when the lamp 70 is "on" or illuminated the resistance element 71 exhibits a comparatively low resistive value.

As shown in FIGS. 2A and 2B, the terminals of lamp 70 are directly connected across the filtering capacitor 67. As is well known, a neon lamp will not conduct or "fire" until the voltage across it exceeds a predetermined threshold or ionization value. Accordingly, the neon lamp 70 will remain nonconducting or "off" until the voltage across it exceeds a preselected amplitude.

As shown, the photopositive resistor 71 along with a resistor 75 forms a voltage dividing network which is connected between the positive terminal B+ of the supply source and ground. The junction of this latter voltage dividing network serves as an input terminal to the A.C. amplifier 74, that is, the junction is connected to the base of NPN transistor 78 by coupling capacitor 77. The base electrode of transistor 78 is also connected to the positive terminal B+ by resistor 76. The collector electrode of transistor 78 is connected to the positive terminal B+ by resistor 79. The emitter electrode of transistor 78 is connected to ground through the metallic casing of the voltage level sensing device 69, which provides a constant check against short-circuits existing from the lamp 70 and to the case and from the case to the photopositive resistor 71. The collector electrode of transistor 78 is connected to the base electrode of NPN transistor 81 through coupling capacitor 80. The collector electrode of transistor 81 is connected to the positive supply terminal B+ through resistor 82. The emitter electrode of transistor 81 is directly connected to ground. The collector electrode of transistor 81 is directly connected to the base electrode of the NPN transistor 83. The collector electrode of transistor 83 is directly connected to the positive terminal B+ of the supply source. As shown, a diode 84 interconnects the emitter and base electrodes of transistor 83. The use of the diode 84 improves the operation and avoids the need for employing a collector load resistor for the transistor 83. That is, an emitter-follower stage would generally consume an appreciable amount of power in the form of heat and thereby reduces the overall effectiveness and efficiency of the circuit.

The amplified output signals taken from the emitter of transistor 83 are applied to the voltage rectifier or half-wave voltage doubler network 90. The emitter electrode is connected by capacitor 91 to the junction point of the anode of diode rectifier 92 and the cathode of diode rectifier 93. The cathode of diode rectifier 92 is connected to ground. The anode of transistor 93 is connected to one side of the capacitor 94 and also forms the output terminal 95 which is adapted to be connected to the utilization device 5 as shown in FIG. 1. The other end of capacitor 94 is connected to ground.

Turning now to the operation, it will be assumed that the vehicle is proceeding at or below the preselected speed command so that the signals generated by speed sensing device 1 are filtered and limited to filter-limiter 2 and then applied to the input terminal 8 of the fixed frequency generating circuit 3. These signals delivered to the input terminal are fed to the base of the first stage of amplifier 9 by capacitor 10 and are current amplified and appear as amplified signals at the emitter electrode of transistor 19. The output signals taken from the emitter electrode of transistor 19 are rectified by the half-wave voltage doubler 21 and a negative potential appears at the junction of the anode of diode 24 and the upper end of capacitor 25 with respect to ground and having a magnitude approximately equal to the peak-to-peak value of the signals taken from the emitter of transistor 19. With the negative potential being supplied to the oscillator 30, the transistors 31 and 32 alternately conduct with the result that square-wave signals are produced on the emitter of transistor 41, the amplitude of which is proportional to the magnitude of the negative supply potential. The square-wave signals taken from the emitter of transistor 41 are amplified by the three-stage amplifier 45 and appear on emitter electrode of transistor 48. The amplified signals taken from the emitter electrode of transistor 48 are further stepped-up by the transformer 60 to a voltage amplitude sufficient to result in conduction or ionization of the neon lamp 70.

The diode rectifier 65 shifts the D.C. reference of the A.C. voltage signals so that the neon lamp observes a series of discrete signal pulses. As briefly mentioned, when no light impinges upon the photopositive element 71 it assumes a high resistance condition and when light impinges upon the photopositive resistor 71 it presents a very low resistance. Accordingly, when the signal pulses are applied to the neon lamp 70 and their amplitude exceeds the threshold or ionizing value of the neon lamp 70, the lamp will "fire" thereby iluminating the photosensitive resistor 71 and drastically reducing its resistance. When the pulse signal disappears or its amplitude decreases below the threshold or ionizing potential, the neon lamp 70 becomes extinguished and the photopositive resistor 71 assumes its high resistance condition. As is readily evident, the cycle is repeated continuously as long as the amplitude of the signal pulses exceeds the ionizing potential of neon lamp 70. The changing of the resistive value of the photopositive resistor 71 due to the illumination and nonillumination of the neon lamp 70 causes a varying voltage potential to appear on the base electrode of transistor 78. As a result A.C. signals are produced and appear at the output of amplifier 74.

The amplified A.C. signals are taken from the emitter electrode of transistor 83 and are fed to the voltage rectifier 90. The half-wave voltage doubler rectifies the output signals so that a negative output signal or potential appears on output terminal 95.

In analyzing the operation of the voltage doubler 90, it will be noted that during the positive alternations, the capacitor 91 is charged through the diode rectifier 92 to ground. Conversely during the negative alternations, a discharge circuit path is completed by diode 84 through the emitter-collector electrodes of transistor 81 to the capacitor 94 so that a negative potential having twice the peak voltage of the A.C. signals is available at the output terminal 95. As previously mentioned, the use of the diode 84 not only reduces the amount of wasted power in the circuit but also improves its frequency response due to the increase in the R-C time constant.

As previously mentioned, the negative output voltage appearing on output terminal 95 may be employed to energize a polarized type of electromagnetic relay. It will be appreciated that a polarized relay will only pick-up at times when the voltage appearing on terminal 95 is of a proper polarity, namely, negative, and at any other time the relay remains deenergized and released. Accordingly, as will be described hereinafter, such a reverse polarity requirement insures that it is not possible to falsely energize the output device from the supply source due to a circuit or component failure as was heretofore the case in conventional detector arrangements.

Let us now assume that the vehicle is moving at a speed greater than the prescribed speed command for the given area. Under this condition the signals delivered to input terminal 8 are of a very low value due to the attenuating effect of the low-pass filter. Since the signals applied to terminal 8 are relatively small the amplified signals taken from the emitter of transistor 19 are proportionally decreased. Consequently, the negative supply or operating potential produced by the voltage doubler 21 at this time and fed to the free-running multivibrator is equally minute. Accordingly, the square-wave output signals available at the emitter of transistor 41 have a correspondingly small amplitude, and, therefore, the step-up transformer 60 is incapable of sufficiently raising the amplitude of the signals taken from the emitter of transistor 48 to the ionizing voltage level for firing the neon lamp 70. Hence, the neon lamp 70 remains "off" or nonilluminated and the photopositive resistor 71 exhibits its high value of resistance. In the absence of any resistance change, no A.C. output is available at the emitter of transistor 83 and, therefore, no negative D.C. voltage appears on the output terminal 95. Under this condition, the relay assumes its deenergized and released condition and may appropriately establish a circuit over a back contact to provide a warning that the vehicle is proceeding a speed in excess of the prescribed speed limit.

As previously mentioned, it is of the utmost importance at this time to insure that a circuit or component failure is incapable of providing a suitable output on terminal 95 which is capable of energizing the electromagnetic relay and thereby falsely indicating that the vehicle is moving at a speed below the prescribed limit. It will be noted that each of the amplifiers 9 and 45 is specifically designed so that no conceivable failure can increase their voltage gains. Further, any failure within either voltage rectifier 21 or 90, such as short or open-circuited components, results in the total loss of the necessary supply voltage. For example, a fault occurring in rectifier 21 will remove the necessary negative potential from the free-running multivibrator 30 for producing the square-wave signals. Similarly, a fault occurring in rectifier 90 cannot produce the necessary negative potential at the output terminal 95 for operating the polar sensitive relay. It is readily obvious that an open-circuited condition of the lamp 70 or the resistor 71 destroys the integrity of the voltage sensing device 69 so that the device is unable to produce the necessary impedance changes at the input of amplifier 74. As previously mentioned, the transistor 78 protects and monitors the elements 70 and 71 against any short-circuited conditions in regard to the metallic housing 72. It is also noted that no failure within the amplifier 74 is capable of producing any A.C. signals on the emitter electrode of transistor 83. Further, it may be noted that since the voltage level sensing device 69 is an "on-off" device, the gained stability of amplifier 74 is not a critical factor in designing this amplifier. In addition, it will be observed that since the main power supply is positive and that by requiring a negative operating potential for the free-running multivibrator and a negative energizing voltage for the electromagnetic relay no circuit or component failure can produce a false indicating signal at this time.

Thus, it can be seen that under no circumstances can a reverse polarity voltage be developed on terminal 95 and, therefore, the circuit operates in a fail-safe manner.

It should be understood that the use of the free-running or astable multivibrator is due to the limited frequency range of the voltage level sensing device 69 and particularly that of the neon lamp 70. Accordingly, it will be appreciated that in cases where the frequency range of the voltage level sensing device is not a determining factor, the use of a multivibrator may be dispensed with and the input signals from terminal 8 may be applied directly to the voltage sensing device after sufficient amplification.

Further, it will be noted that the level of a D.C. signal may be detected by the disclosed circuit arrangement by simply applying the D.C. signal to the multivibrator 30.

In addition, it is readily understood that the complements of the transistors, shown and described in the circuit, may be employed and the output voltage on terminal 95 may be of a positive polarity by simply reversing the polarity of the D.C. supply source and the diodes, as is well known, and also that output of both voltage rectifiers should be of a polarity opposite to that of the D.C. power supply.

Further, it is understood that in lieu of the electromagnetic relay, a static relay, such as a transistor or other suitable semiconductive device may be operated by the described circuit.

It also will be appreciated that while this invention finds particular utility in a speed control system, it is readily evident that this invention is not limited thereto but may be employed in other various systems and apparatus, such as logic circuitry, which require the security and safety inherently present in this invention. But regardless of the manner in which the invention is used, it is understood that various alterations may be made by persons skilled in the art without departing from the spirit and scope of this invention.

Having thus described my invention, what I claim is:

1. A fail-safe level detector comprising, a source of input signals, photosensitive means connected to said source for measuring the amplitude of said input signals, and a fail-safe circuit means connected to said photosensitive means for providing an output when and only when no circuit or component failure is present and the amplitude of said input signals exceeds a predetermined level.

2. A level detector as defined in claim 1, wherein said photosensitive means includes a voltage responsive element and a photoresistive element.

3. A level detector as defined in claim 1, wherein said photosensitive means includes a neon lamp and a photopositive resistor.

4. A level detector as defined in claim 1, wherein said circuit means includes a plurality of amplifier stages for amplifying said output.

5. A level detector as defined in claim 1, wherein said circuit means includes a voltage rectifier network.

6. A level detector as defined in claim 5, wherein said voltage rectifier network includes a pair of diodes and capacitors for rectifying and doubling the amplitude of the amplified output of said amplifier.

7. A level detector as defined in claim 5, wherein said circuit means includes a plurality of transistorized amplifying stages electrically interconnecting said photosensitive means to said voltage rectifier network.

8. A level detector as defined in claim 2, wherein said neon lamp and said photoresistive element are mounted within an integral tubular metallic housing, and said circuit means includes means for constantly checking against a short-circuited condition existing between the metallic housing and said neon lamp and said photoresistive element.

9. A fail-safe electronic circuit arrangement for providing an output signal in response to the reception of preselected input signals comprising, fail-safe means for converting the input signals into signals having a fixed frequency, and fail-safe means for measuring the amplitude of said fixed frequency signals and for generating said output signal when and only when the amplitude of said fixed frequency signals exceeds a predetermined threshold value and in the absence of a critical circuit or component failure.

10. A circuit as defined in claim 9, wherein said converting means includes a first amplifier for amplifying the input signals, a first voltage rectifier coupled to said first amplifier for rectifying the amplified signals, a constant frequency generator supplied by said voltage rectifier for generating said fixed frequency signals, a second amplifier coupled to said constant frequency generator for amplifying said fixed frequency signals, and a coupling network receiving said amplified fixed frequency signals and applying said amplified fixed frequency signals to said measuring means.

11. A circuit as defined in claim 10, wherein said measuring means includes a voltage level sensing device electrically connected to said coupling network and only responsive to fixed frequency signals exceeding said threshold value, a third amplifier electrically coupled to said voltage level sensing device, and a second voltage rectifier electrically coupled to said third amplifier for producing said output signal.

12. A circuit as defined in claim 10, wherein said first amplifier comprises a first and second transistor connected in cascade.

13. A circuit as defined in claim 10, wherein said first voltage rectifier comprises a pair of diodes and capacitors interconnected in a voltage doubling arrangement.

14. A circuit as defined in claim 10, wherein said constant frequency generator comprises a transistorized free-running multivibrator.

15. A circuit as defined in claim 10, wherein said second amplifier comprises three transistors interconnected in cascade relationship.

16. A circuit as defined in claim 10, wherein said coupling network comprises a transformer and a half-wave rectification circuit.

17. A circuit as defined in claim 11, wherein said third amplifier comprises three transistors interconnected in cascade relationship.

18. A circuit as defined in claim 11, wherein said second voltage rectifier comprises a pair of diodes and capacitors interconnected in a voltage doubling arrangement.

19. A fail-safe circuit arrangement comprising, input and output terminals, first and second terminals adapted to be connected to a supply source, a first amplifier including a first and a second transistor, each transistor having an emitter, a collector and a base electrode, a first voltage divider including a first and a second resistor connected between said first and second terminals of said supply source, a first capacitor connected between said input terminal and the junction of said first and second resistors, the base electrode of said first transistor connected to the junction of said first and second resistors, the collector electrodes of said first and second transistors connected to said first terminal, the emitter electrodes of said first and second transistors resistively coupled to said second terminal, the base electrode of said second transistor resistively coupled to the emitter electrode of said first transistor, a first voltage doubling network including a first pair of rectifiers and capacitors, said rectifiers connected in series circuit relation with each other, one of said pair of capacitors connected between the emitter electrode of said second transistor and the junction of said pair of rectifiers, one end of said series circuit connected to said second terminal, the other of said pair of capacitors connected between the other end of said series circuit and said second terminal, a free-running multivibrator including three transistors each having an emitter, a collector and a base electrode, the emitter electrodes of two of said three transistors and the collector electrode of the other of said three transistors connected to said second terminal, the collector electrode of said two of said three transistors and the emitter electrode of said other of said three transistors resistively coupled to the other end of said series circuit, the base and collector electrodes of said two of said three transistors cross coupled by respective series connected diodes and capacitors, the junction of each of said respective series connected diodes and capacitors resistively coupled to the other end of said series circuit, the base electrode of said other of said three transistors connected to the collector electrode of one of said two of said three transistors, a second amplifier including three transistors each having an emitter, a collector and a base electrode, a second voltage divider including a pair of resistors connected between said first and second terminals of said supply source, a second capacitor connected between the emitter electrode of said other of said three transistors and the junction of said pair of resistors, the base electrode of the first of said three transistors connected to the junction of said pair of resistors, the collector electrode of said first of said three transistors resistively coupled and the collector electrodes of the second and third of said three transistors connected to said first terminal, the emitter electrodes of said first, second and third of said three transistors resistively coupled to said second terminal, the base electrode of said second of said three transistors connected to said collector electrode of said first of said three transistors, the base electrode of said third of said three transistors connected to the emitter electrode of said second of said three transistors, a transformer having a primary and a secondary winding, one end of said primary winding capacitively coupled to the emitter electrode of said third of said three transistors and the other end of said primary winding connected to said second terminal, a half-wave rectifier includig a series connected diode rectifier and current limiting resistor, one end of said secondary winding capacitively coupled to the junction of said series connected diode rectifier and current limiting resistor and the other end of said secondary winding connected to said second terminal, a third capacitor connected from one end of said series connected diode rectifier and current limiting resistor to said second terminal, the other end of said series connected diode rectifier and current limiting resistor connected to said second terminal, a photosensitive element having a lamp and a photopositive resistor enclosed within a metallic housing, one end of said lamp connected to said one end of said series connected diode rectifier and current limiting resistor and the other end of said lamp connected to said second terminal, a third voltage divider including said photopositive resistor and a third resistor connected between said first and second terminals of said supply source, a third amplifier including an input, an intermediate and an output transistor with each having an emitter, a collector and a base electrode, the base electrode of said input transistor resistively coupled to said first terminal and capacitively coupled to the junction of said photopositive and third resistor, the collector electrode of said input transistor resistively coupled to said first terminal, the emitter electrode of said input transistor connected through said metallic housing to said second terminal, the collector electrode of said intermediate transistor resistively coupled to said first terminal, the emitter electrode of said intermediate transistor connected to said second terminal, the base electrode of said intermediate transistor capacitively coupled to the collector electrode of said input transistor, the collector electrode of said output transistor connected to said second terminal, the base electrode of said output transistor connected to the collector electrode of said intermediate transistor, an asymmetrical conducting device interconnecting the emitter and the base electrodes of said output transistor, and a second voltage doubling network including a second pair of rectifiers and capacitors, said second pair of rectifiers connected in series circuit relation with each other, one of said second pair of capacitors connected between the emitter of said output amplifier and the junction of said second pair of rectifiers one end of said series circuit of said second pair of rectifiers connected to said second terminal, the other end of said series circuit of said second pair of rectifiers connected to said output terminal, and the other of said second pair of capacitors connected between said second terminal and said other end of said series circuit of said second pair of rectifiers whereby the presence of a signal on said output terminal indicates that the signals appearing on said input terminal have the predetermined desired characteristic.

20. A fail-safe level detector comprising, a source of input signals, a photosensitive means connected to said source for measuring the amplitude of said input signals, and circuit means connected to said photosensitive means for providing an output when and only when the amplitude of said input signals exceeds a predetermined level, said circuit means including a voltage rectifier network and a plurality of transistor amplifier stages electrically interconnecting said photosensitive means to said voltage rectifier network, and an additional diode connected between the input and output terminals of the last amplifying stage to provide an electrical discharge path for said rectifier network.

21. A fail-safe electronic circuit arrangement for providing an output signal in response to the reception of preselected input signals comprising, means for converting the input signals into signals having a fixed frequency, and means for measuring the amplitude of said fixed frequency signals and for generating said output signal when and only when the amplitude of said fixed frequency signal exceeds a predetermined threshold value, said converting means including a first amplifier for amplifying the input signals, a first voltage rectifier coupled to said first amplifier for rectifying the amplified signals, a constant frequency generator supplied by said voltage rectifier for generating said fixed frequency signals, a second amplifier connected to said constant frequency generator for amplifying said fixed frequency signals, and a coupling network receiving said amplified fixed frequency signals and applying said amplified fixed frequency signals to said measuring means, said measuring means including a voltage level sensing device electrically connected to said coupling network and only responsive to fixed frequency signals exceeding said threshold value, a third amplifier electrically coupled to said voltage level sensing device and a second voltage rectifier electrically coupled to said third amplifier for producing said output signal, and wherein said voltage level responsive device comprises a neon lamp and a photopositive resistor.

References Cited
UNITED STATES PATENTS

| | | | |
|---|---|---|---|
| 3,214,640 | 10/1965 | Mills | 317—50 X |
| 3,246,227 | 4/1966 | Strohmeier | 317—33 X |
| 3,253,188 | 5/1966 | Nissel | 317—10 |

JAMES D. TRAMMELL, Primary Examiner

U.S. Cl. X.R.

317—33, 50; 328—150